(12) United States Patent
Rodriguez et al.

(10) Patent No.: US 10,560,423 B1
(45) Date of Patent: Feb. 11, 2020

(54) IDENTIFYING AND PREDICTING SPAMMER DOMAINS THROUGH DNS REPUTATION SYSTEM LOOKUPS AND DNS QUERY VOLUMES

(71) Applicant: Cisco Technology, Inc., San Jose, CA (US)

(72) Inventors: David Brandon Rodriguez, Berkeley, CA (US); Jakob Josa Matthias Dohrmann, San Francisco, CA (US); Andrea Michelle Scarfo, San Mateo, CA (US); Thibault Gilbert Reuille, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 15/659,788

(22) Filed: Jul. 26, 2017

(51) Int. Cl.
*H04L 29/12* (2006.01)
*H04L 29/06* (2006.01)

(52) U.S. Cl.
CPC ...... *H04L 61/1511* (2013.01); *H04L 63/1425* (2013.01); *H04L 29/06* (2013.01); *H04L 29/12* (2013.01)

(58) Field of Classification Search
CPC .......................... H04L 61/1511; H04L 63/1425
See application file for complete search history.

(56) References Cited

U.S. PATENT DOCUMENTS

| 9,189,626 | B1* | 11/2015 | Overfield | ............ H04L 63/0254 |
| 2011/0087769 | A1* | 4/2011 | Holmes | .................. G06Q 30/00 709/224 |
| 2016/0065535 | A1* | 3/2016 | O'Leary | ............... G06F 16/248 707/728 |
| 2017/0099314 | A1* | 4/2017 | Klatt | .................... H04L 63/1433 |

OTHER PUBLICATIONS

Rodriquez, et al., "In the Eye of Hailstorm," Cisco Umbrella, OpenDNS Umbrella Blog, Dec. 19, 2016, 4 pages.

* cited by examiner

*Primary Examiner* — Nasser M Goodarzi
*Assistant Examiner* — Adil Ocak
(74) *Attorney, Agent, or Firm* — Edell, Shapiro & Finnan, LLC

(57) ABSTRACT

The methodology for detecting spammer domains includes storing a plurality of DNS requests, wherein each DNS request comprises a combination of a higher level domain name and a lower level domain name, and wherein the higher level domain name corresponds to a blacklist server and the lower level domain name is a domain name that is to be used as a query directed towards the blacklist server, filtering the DNS requests to obtain a plurality of lower level domains, calculating a popularity score for each unique lower level domain name of the plurality of lower level domain names, determining whether a given unique lower level domain name is suspicious based on the popularity score, and when the given unique lower level domain name is determined to be suspicious based on the popularity score, adding the given unique lower level domain name to a blocklist.

20 Claims, 5 Drawing Sheets

US 10,560,423 B1

IDENTIFYING AND PREDICTING SPAMMER DOMAINS THROUGH DNS REPUTATION SYSTEM LOOKUPS AND DNS QUERY VOLUMES

TECHNICAL FIELD

The present disclosure relates to detecting potentially malicious domains by analyzing domain name service (DNS) queries to third party feeds.

BACKGROUND

A domain name service (DNS) server is employed to, among other things, resolve a fully quantified domain name (FQDN) to an Internet Protocol (IP) address. For example, a client application, such as a browser, running on a host computer might receive input from a user when the user selects a link on a webpage. The link is associated with content that the user would like to access, but the content might be stored on a remote server. In order for the browser to obtain the content from the remote server, the browser must first obtain an IP address corresponding to the remote server. In this regard, a DNS server is configured to resolve a given FQDN provided in a DNS request, and received from the client application, to a corresponding IP address. The corresponding IP address is then returned to the browser from the DNS server in a DNS response.

DNS servers can also receive DNS requests from clients other than a browser application. For example, an email server, an accounting application, or a web security application, among others, might also have a need to resolve a domain name to an IP address, or vice versa.

DESCRIPTION OF EXAMPLE EMBODIMENTS

Overview

A methodology is provided for detecting malicious or spammer domains. The methodology includes storing a plurality of domain name system (DNS) requests, wherein each DNS request of the plurality of DNS requests comprises a combination of a higher level domain name and a lower level domain name, each of the higher level domain name and the lower level domain name being separately resolvable to a respective Internet Protocol (IP) address, and wherein the higher level domain name corresponds to a blacklist server and the lower level domain name is a domain name that is to be used as a query directed towards the blacklist server, filtering the DNS requests to obtain a plurality of lower level domains, calculating a popularity score for each unique lower level domain name of the plurality of lower level domain names, determining whether a given unique lower level domain name is suspicious based on the popularity score, and when the given unique lower level domain name is determined to be suspicious based on the popularity score, adding the given unique lower level domain name to a blocklist.

In another embodiment, a device is provided. The device includes an interface unit configured to enable network communications, a memory, and one or more processors coupled to the interface unit and the memory, and configured to: store a plurality of domain name system (DNS) requests, wherein each DNS request of the plurality of DNS requests comprises a combination of a higher level domain name and a lower level domain name, each of the higher level domain name and the lower level domain name being separately resolvable to a respective Internet Protocol (IP) address, and wherein the higher level domain name corresponds to a blacklist server and the lower level domain name is a domain name that is to be used as a query directed towards the blacklist server, filter the DNS requests to obtain a plurality of lower level domains, calculate a popularity score for each unique lower level domain name of the plurality of lower level domain names, determine whether a given unique lower level domain name is suspicious based on the popularity score, and when the given unique lower level domain name is determined to be suspicious based on the popularity score, add the given unique lower level domain name to a blocklist.

Example Embodiments

Figure 1:
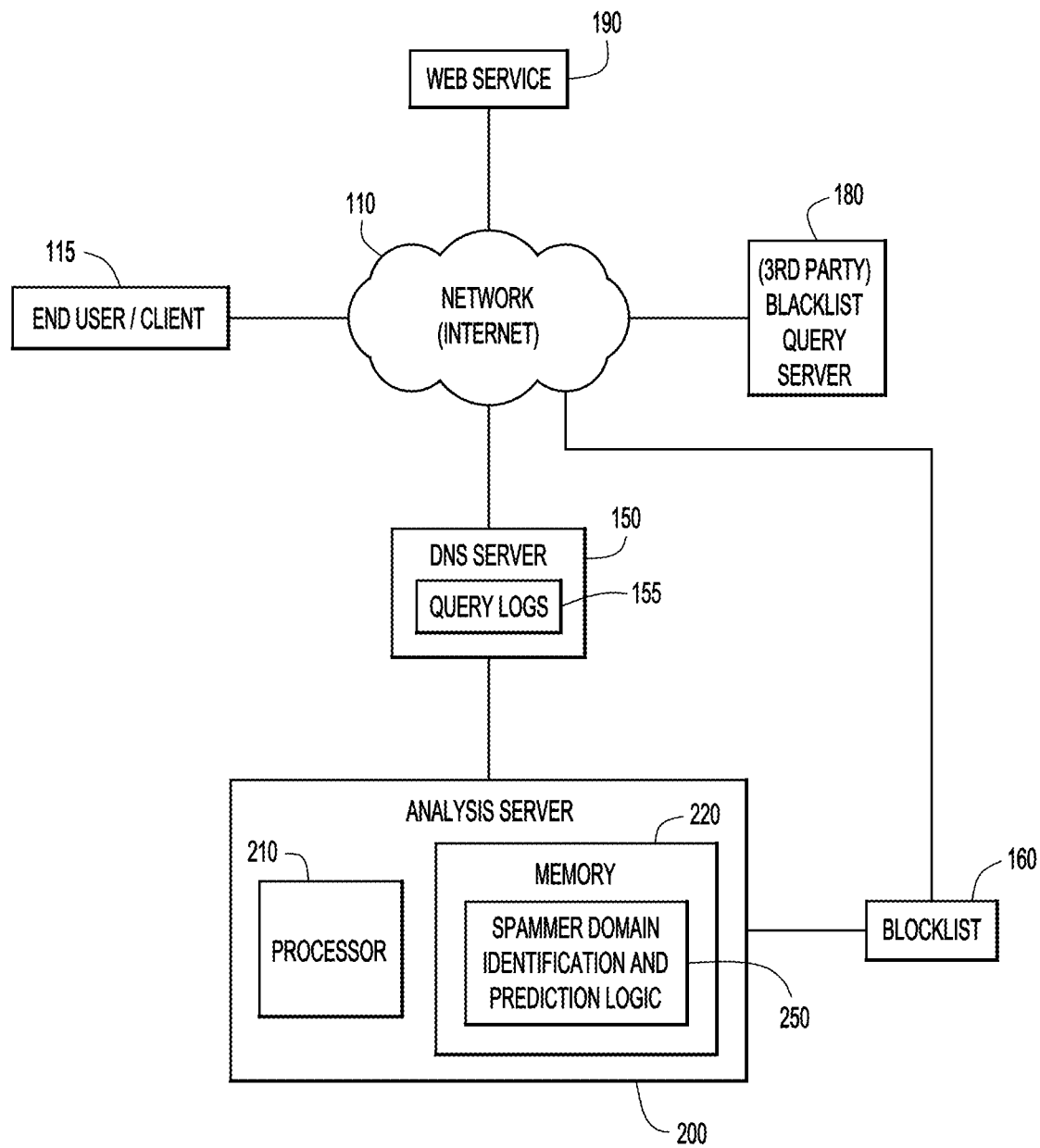
FIG. 1 depicts an electronic communications network in which malicious or spammer domain identification and prediction logic may operate in accordance with an example embodiment.

FIG. 1 depicts an electronic communications network in which spammer (or malicious) domain identification and prediction logic may operate in accordance with an example embodiment. Specifically, a network 110, such as the Internet, interconnects an end user/client 115, a ($3^{rd}$ party) blacklist query server 180, a web service 190, and a DNS server 150. Those skilled in the art will appreciate that FIG. 1 is a simplified diagram showing only one of each network connected device. However, in a real world implementation, multiple DNS servers 150 might operate in a distributed manner, and there may be hundreds or thousands of instances of each of end user/client 115, and ($3^{rd}$ party) blacklist query server 180 and web service 190.

As noted, DNS server 150 is employed to, among other things, resolve a fully quantified domain name (FQDN) to an Internet Protocol (IP) address. For example, a browser application running on end user/client 115 (e.g., a computer) might receive input from a user when the user selects a link on a webpage. The link is associated with content or service that is desired to be accessed by the user, but the content or service might be stored on a remote server (e.g., web service 190). In order for the browser to obtain the content or service from the remote server, the browser must first obtain an IP address of the remote server. In this regard, the browser sends to DNS server 150 DNS a request seeking an IP address corresponding to the domain name of the remote server. The corresponding IP address is returned to the browser (i.e., end user/client 115) by DNS server 150 in a DNS response.

Figure 2:
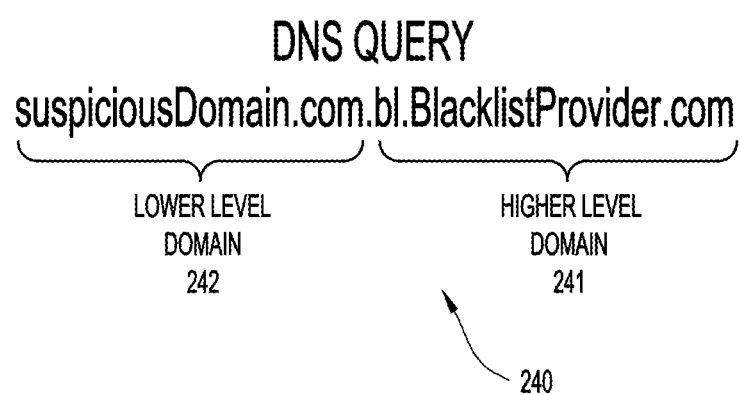
FIG. 2 depicts a form of a nested DNS request that a DNS server might receive in accordance with an example embodiment.

DNS server 150, however, does not just process DNS requests from browsers. An email server or firewall (operating in the instant case as client 115) might also be interested in knowing the reputation of a given domain from which a communication has arrived, or to which, e.g., an embedded link in an email might be pointed to. In this regard, ($3^{rd}$ party) blacklist query server 180, reachable via a given domain name (or domain reputation API), may be employed by such an email server or firewall. FIG. 2 depicts a form of a nested DNS request that may be employed in connection with the embodiments described herein. Specifically, a portion of a DNS query 240 is generated by client 115 (email server, firewall, etc.) that includes the domain name of ($3^{rd}$ party) blacklist query server 180 (in this case "bl.blacklist.com") as a higher level domain 241 and, prepended thereto, the domain name (in this case "SuspiciousDomain.com"), as a lower level domain 242. The lower level domain name is the domain name that the client 115 would like to confirm is not on a blacklist hosted by ($3^{rd}$ party) blacklist query server 180 that is reachable via "bl.blacklist.com." The portion of the DNS query 240 is forwarded to DNS server 150 where the IP address for the higher level domain is resolved to an IP address, which is returned to the client 115. Client 115 may then query ($3^{rd}$ party) blacklist query server 180 using the provided IP address.

Notably, such a DNS request 240 can provide insight into how a given end user/client 115 is behaving and, by extension, it can be determined, by analyzing multiple DNS requests, whether, and how often, domain names are being looked up on domain reputation services, such as ($3^{rd}$ party) blacklist quest server 180.

Referring again to FIG. 1, and in accordance with an embodiment, DNS server 150 captures and/or stores query logs 155 of DNS requests sent by client 115. Query logs 155 may cover hours, days, weeks, or months of collected DNS request data from one or more clients 115, identified via respective IP source addresses.

In accordance with example embodiments, query logs 155 may be analyzed to identify and predict whether given domains should be considered suspicious, malicious, etc., and thus likely controlled by one or more spammers. Specifically, analysis server 200 shown in FIG. 1 includes a processor 210 and memory 220. The memory 220 may store logic instructions for spammer domain identification and prediction logic 250. As will be described in more detail below, spammer domain identification and prediction logic 250 is configured to parse a received DNS query or request to isolate domain names that are to be the subject of a query to a blacklist service provider and, based on one or several metrics about a given such domain name, determine that domain to be suspicious, and thus cause the domain name to be placed in a blocklist 160 and/or be disseminated to other network security devices.

In one actual implementation, a DNS server service provider might "see", e.g., over 10 million DNS queries per hour to domain reputation APIs (e.g., ($3^{rd}$ party) blacklist query server 180). Every hour about 10,000 unique lower level domain 242 and higher level domain 241 combinations are simultaneously looked up by, e.g., 30 or more clients 155 (represented by unique client IP addresses). In other words, 30+ clients 115 spanning diverse geographic regions around the world ask the same question about 10,000+ domains per hour: "Is this domain malicious?"

If users (i.e. clients 115) are actively asking whether a given domain is benign or malicious through third party feeds, i.e., ($3^{rd}$ party) blacklist query server service provider 180, it is possible to recognize and analyze this behavior and establish an independent determination (i.e., suspicious, not suspicious) about the domain. In accordance with the instant embodiments, queries to multiple third party feeds are correlated.

Consider a DNS request in the form of: "baddomain.com-.bl.blacklistprovider.com," which is how a query to a DNS reputation service (or API) might be formed and it is in that form that DNS server 150 would receive it. Traditional classifiers look at such a query and undertake a search to determine if any of the following domains are malicious:

blacklistprovider[.]com
bl.blacklistprovider[.]com
com.bl.blacklistprovider[.]com
baddomain.com.bl.blacklistprovider[.]com Interestingly, all such domains would pass as benign since it is only, in fact, "baddomain.com" that should be the target of analysis, but there is no query to it. Such a scenario can happen, for example, when someone receives an email from an unknown sender. The receiving organization (e.g., represented by client 115) would then look up domains associated with the email on known blacklists without the organization or user ever making an actual query to the domain.

A process for identifying and predicting malicious or spammer domains using spammer domain identification and prediction logic (sometimes more simply referred to hereinafter as "logic") 350, that leverages the DNS query to reputation APIs, is next discussed with reference to FIG. 3. A high level discussion is presented first with additional detail provided thereafter. Query logs 355 are filtered to find lookups to known blacklist services (e.g., ($3^{rd}$ party) blacklist query server 180). Then, at 310, logic 350 is configured to strip the domains being looked up from those queries and further process the domains leaving only the second level domain (2LD)+top level domain (TLD). At 325, logic 350 is configured to then compute the "popularity" of domains that are being looked up (considering the unique number of clients and total number of queries for those domains). Using a predetermined threshold, logic 350 then filters and considers those domains that have at least some number of clients looking them up or some number of clients plus at least another number of feeds they are being looked up on.

Through the operation of 325, it is possible to identify possible spammer domains. For example, if within a number of seconds or minutes there is a sudden spike in a query for a given domain name for which few or no queries have recently been made, then logic 350 may be configured to consider such a domain to be suspicious.

At 330, the identified pool of popular domains being looked up on blacklists are fed into a streaming platform which enables computations over domains, registrants, and hosting IPs in parallel. For example, from a domain (2LD+TLD), related information is looked up such as the historical query-volume to the domain 331, the hosting IP 333, and the registrant 332. Similarly, given a registrant 332, logic 350 may look up additional registered domains 331. For a given hosting IP address 333, logic 350 may look up other domains hosted on the given IP address. Intermediate stages may stop, pause, cache 323, or persist the processing of a domain, registrant, or hosting IP.

A domain, registrant or hosting IP can be immediately flagged and published to a blocklist 360 or persisted to a database 321 maintaining the domain-registrant-hosting IP relationships.

One step to validate that a domain should be pushed to the blocklist 360 is to process the signal of query-volume to the domain over the past 30 days. Here, logic 350 may implement a statistical technique to identify spikes in query-volume that are typically associated with certain spam sending activity.

The predictive component of logic 350 embodied by 330 comes from mining the persisted graph stored in 321. Specifically, logic 350 monitor registrants and hosting IPs for newly seen domains. In other words, logic 350 monitors at fixed intervals for newly registered domains and hosted domains, respectively. These fixed intervals may be implemented using fixed time interval watch list 322.

Cache 323, graph database 321 and fixed time interval watch list 322 may also be hosted by memory 320 that is in communication with processes 325, 330 and blocklist 360.

Figure 3:
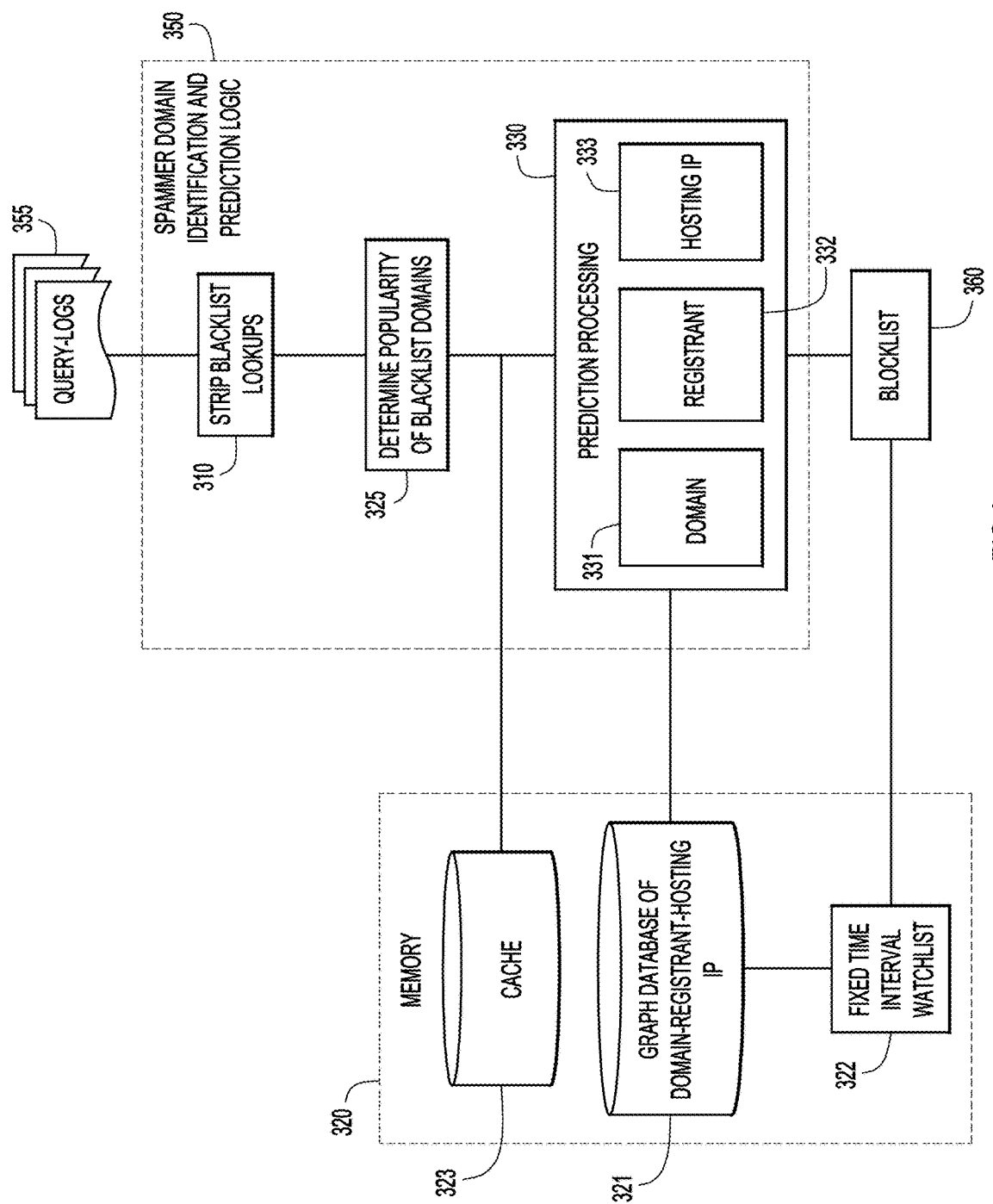
FIG. 3 depicts a block diagram and related process to identify and predict a spammer domain in accordance with an example embodiment.

Additional detail about elements of FIG. 3 is provided below.

Strip Blacklist Lookups

There are a variety of third party feeds that can be used to look up a domain to see if it is on a known blacklist. An API call in the form of a DNS query might look like: "baddomain.com.bl.blacklistprovider.com." In other words, a client is seeking a lookup of "baddomain.com" at "bl.blacklistprovider.com."

In one possible implementation, within a Hadoop mapreduce job written in Pig, logic 350 filters the query logs 355 into distinct (client IP, FQDN) tuples representing the client IP looking up some domain through a third party feed. To identify FQDNs which are blacklist lookups, logic 350 uses a regular expression (regex) over, in a particular implementation, some 300 popular third party feeds. Next, logic 350 stems the domains from the fully qualified domain name, by regex'ing for the unique third party feed name and replacing it with an empty string.

Logic 350 then projects the query logs 355 into simple (client IP, domain) tuples for further processing. That is, the tuples represent which client IPs are looking up which potentially suspicious domains.

Popularity of BlackList Domains

Given a series of (client IP, domain) tuples, logic 350 can perform simple "group by" counts over the domains representing the popularity of looking up the domain through third party feeds. For example, the following tuples might generated:

(A, baddomain.com)
(B, baddomain.com)
(B, baddomain.com)

A "group by domain" count would result in (baddomain.com, 3). This metric allows logic 350 to gauge how often users looked up a given domain through any API.

Considering distinct (client, domain) tuples and then group by count over domain, the above tuples would result in a count (baddomain.com, 2) showing us how many unique clients (A and B, in this case) looked up a given domain.

There are thus two scores per domain: a count including information about the client and the feed which a domain was looked up, and the unique number of clients looking up a domain. With this information, logic 350 can generate a "popularity score" which does any of the following:

Flag any domain with a unique client and feed count above a predetermined threshold, Flag any domain with a unique number of client count above a predetermined threshold, and/or Flag any domain with a divergence of the two client/feed and client counts above a predetermined thresholds k.

Any of the above metrics may be used as the popularity score.

Streaming Parallel Computations and Prediction Processing

Given a set of flagged domains, logic 350 pushes these domain into a queue at a given socket. Using a greedy strategy, logic 350 has some k workers read from the queue and pull from the socket. Each worker knows a set of actions given the element read from the queue. For example, each worker knows how to process a domain 331, registrant 332 or hosting IP 333.

For example, suppose a worker pops an element of type domain from the queue. Then, logic 350 fetches the last 30 days of query volume to the domain, the registrant, and hosting IP as well as IPs associated via, e.g., a sender policy framework (SPF) record of the domain. The registrant and hosting IP are then pushed into the queue to be processed. With the fetched query volume, logic 350 processes the signal for, e.g., sparsity, max, min and values at several percentiles, skew, and kurtosis of the signal. This provides enough information to determine if the signal is spiking. In another possible implementation, logic 350 may use sliding window techniques and a combination of elastic-net and random forest models to classify spiking time-series.

For a registrant, a worker makes an API call and retrieves all known domains registered by the given registrant. These new domains, are then queued to be processed. Similarly, for a hosting IP, a worker makes an API call and retrieves all the other domains currently hosted on the given hosting IP. These new domains, again, are queued to be processed.

As the workers have made API calls and gathered various bits of information, the resulting information is then stored in a database 321. In one implementation, processed items are stored in a graph-like structure that maintains meaningful relationships between source and destination vertices. For example, given a domain, logic 350 may retrieve the registrant and hosting IP and store both "domain→registrant" as well as "domain→hosting IP" relationships.

Lastly, since the described functionality is performed in a streaming fashion, logic 350 may maintain a cache 323 of recent items along with a time to live, so that logic 350 does not undertake redundant or unnecessary work.

Graph Database

As mentioned, logic 350 stores processed items including the domain, registrant, and hosting IP in a database 321 maintaining the relationship of domain to registrant and hosting IP. This graph database 321 can then be easily queried to retrieve neighboring nodes or to compute summary statistics of node degrees. The node degrees, in particular, can be used to identify heavy hitting registrants and hosting IPs that have a lot of spiking domains associated with them.

Fixed Time Interval Watchlist

As mentioned, database 321 can be queried to find registrants and hosting IPs with the greatest proportion of spiking domains related to them. This provides an advantageous way of finding, and anticipating, what domains may spike in the future. That is, given that the registrant or hosting IP already has a lot of spiking domains related to them, any new domain associated with them may have a higher probability of spiking. For example suppose a registrant R has 10 domains related to them and 9 of them spike. That is, 90% of the domains related to this registrant spike. Any future domain registered by this registrant, assuming all other things are equal in the future, is therefore likely to spike. The same methodology can be applied to perform belief propagation for other indicators of "spammy" behavior alongside or independent of spiking query volume.

Blocklist

Both the popularity determination and prediction processing produce domains associated with a certain confidence of "spamminess." Logic 350 can thus, at any time, feed these domains into a blocklist 360 which are then exported to other DNS resolvers to block incoming queries to these domains. Lists of domains at several levels of confidence can also be used in Anti-Spam and Web-security services.

Thus, the instant embodiments provide a way to monitor and detect malicious domains looked up in DNS queries to third party feeds. In particular, logic operates to stem fully qualified domains (FQDNs) down to 2LD+TLDs hidden in the FQDN. Logic then establishes two measures to rank the popularity or magnitude of a domain that is actively being looked up by clients. Given this information, logic is configured to distribute and scale, potentially, tens of thousands of domains per hour using a queue and socket design which distributes work among a set of workers. Further, the logic enables a graph database configured to propagate highly offensive registrants and hosting IPs that should be monitored for newly seen domains.

The methodology described herein is capable of running hourly on billions of DNS queries. Through a combination of Hadoop batch jobs and stream processing it is possible to integrate and retrieve the various details necessary to propagate information about a domain to a registrant and hosting IP. With the inclusion of a watchlist over hosting IPs and registrants, the embodiments described herein provide an edge to detecting newly-seen domains and blocking domains before they receive any queries.

Figure 4:
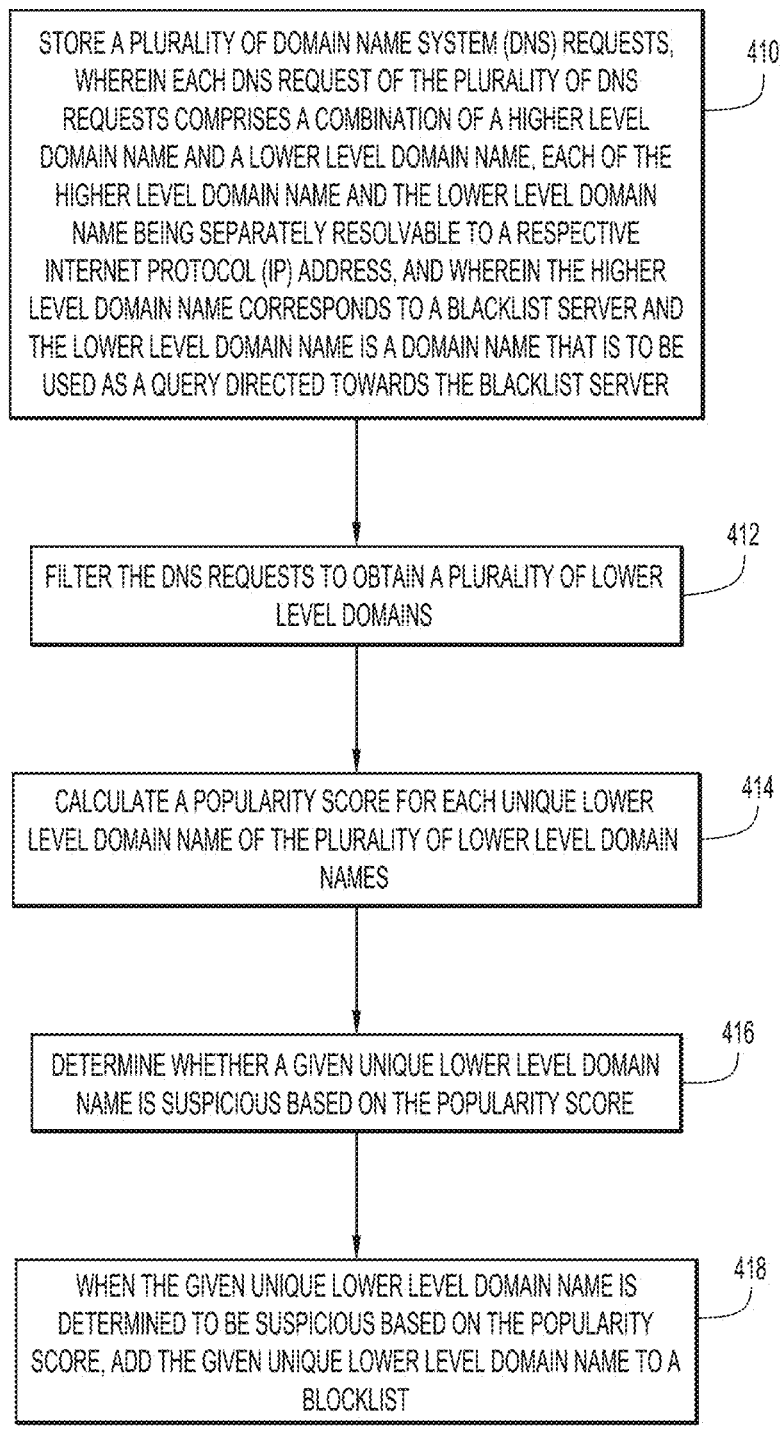
FIG. 4 is a flow chart of a series steps for identifying and predicting a spammer domain in accordance with an example embodiment.

FIG. 4 is a flow chart of a series steps for identifying and predicting a spammer domain in accordance with an example embodiment. At 410, the instant methodology stores a plurality of domain name system (DNS) requests, wherein each DNS request of the plurality of DNS requests comprises a combination of a higher level domain name and a lower level domain name, each of the higher level domain name and the lower level domain name being separately resolvable to a respective Internet Protocol (IP) address, and wherein the higher level domain name corresponds to a blacklist server and the lower level domain name is a domain name that is to be used as a query directed towards the blacklist server.

At 412, the DNS requests are filtered to obtain a plurality of lower level domains.

At 414 a popularity score is calculated for each unique lower level domain name of the plurality of lower level domain names.

At 416, the methodology further includes determining whether a given unique lower level domain name is suspicious based on the popularity score.

And, at 418, when the given unique lower level domain name is determined to be suspicious based on the popularity score, the given unique lower level domain name is added to a blocklist.

Figure 5:
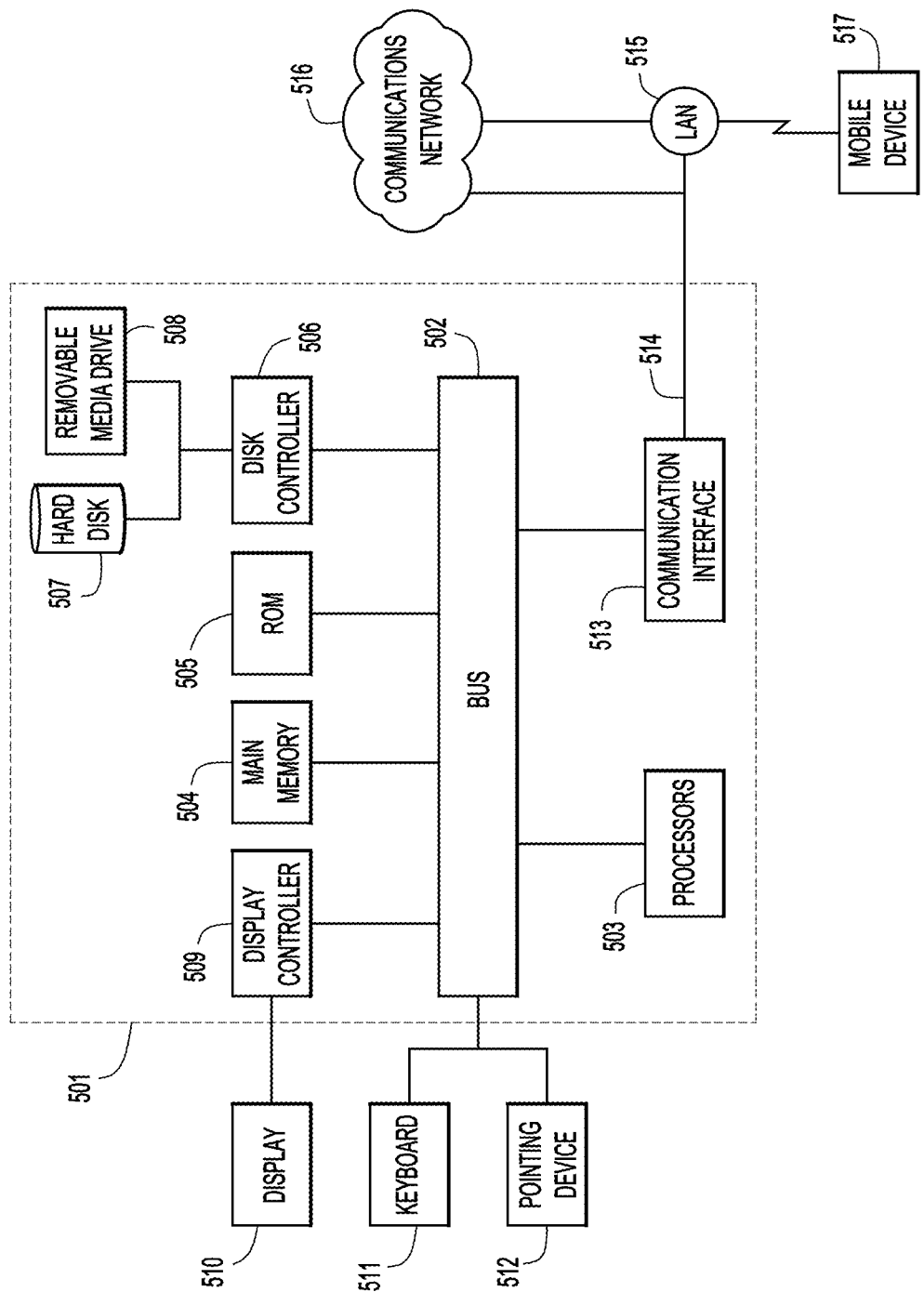
FIG. 5 is a block diagram of a device (e.g., a server) on which spammer domain identification and prediction logic may be implemented.

FIG. 5 is a block diagram of a device or apparatus (e.g., a server) on which anomaly detection logic may be implemented. The apparatus may be implemented on or as a computer system 501. The computer system 501 may be programmed to implement a computer based device. The computer system 501 includes a bus 502 or other communication mechanism for communicating information, and a processor 503 coupled with the bus 502 for processing the information. While the figure shows a single block 503 for a processor, it should be understood that the processor 503 represents a plurality of processors or processing cores, each of which can perform separate processing. The computer system 501 may also include a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions (e.g., the logic 250, 350) to be executed by processor 503. In addition, the main memory 504 may be used for storing temporary variables or other intermediate information during the execution of instructions by the processor 503.

The computer system 501 may further include a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 may also include a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT) or liquid crystal display (LCD), light emitting diode (LED) display, for displaying information to a computer user. The computer system 501 may include input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510.

The computer system 501 performs a portion or all of the processing operations of the embodiments described herein in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the described embodiments, and for enabling the computer system 501 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including, but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516. For example, the communication interface 513 may be a wired or wireless network interface card or modem (e.g., with SIM card) configured to attach to any packet switched (wired or wireless) LAN or WWAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection to a mobile device 517 such as a personal digital assistant (PDA) laptop computer, cellular telephone, or modem and SIM card integrated with a given device.

In sum, there is provided a methodology including operations of storing a plurality of domain name system (DNS) requests, wherein each DNS request of the plurality of DNS requests comprises a combination of a higher level domain name and a lower level domain name, each of the higher level domain name and the lower level domain name being separately resolvable to a respective Internet Protocol (IP) address, and wherein the higher level domain name corresponds to a blacklist server and the lower level domain name is a domain name that is to be used as a query directed towards the blacklist server, filtering the DNS requests to obtain a plurality of lower level domains, calculating a popularity score for each unique lower level domain name of the plurality of lower level domain names, determining whether a given unique lower level domain name is suspicious based on the popularity score, and when the given unique lower level domain name is determined to be suspicious based on the popularity score, adding the given unique lower level domain name to a blocklist.

In an embodiment, the popularity score comprises at least one of a number of times the given unique lower level domain has been observed over a predetermined period of time or a number of distinct clients from whom a DNS request including the given unique lower level domain name was received.

The methodology may further include storing the given unique lower level domain name in combination with a client IP address from which a DNS request including the given unique lower level domain name was received, and converting the combination of a higher level domain name and a lower level domain name received in different DNS requests among the plurality of DNS requests to a regular expression before filtering.

The methodology may still also include comprising blocking a reply to a new DNS request that includes the given unique lower level domain name and/or disseminating the given unique lower level domain name to a network security device as a domain name to block.

In one embodiment, the methodology further includes storing along with the given unique lower level domain name, registrant information for the given unique lower level domain name, and a host IP address associated with the given unique lower level domain name and, for a plurality of stored unique lower level domain names, respective registrant information and associated host IP addresses processing the respective registrant information and associated host IP addresses to identify registrants or host IP addresses that are suspected of being malicious based on their respective association with the given unique lower level domain name. Processing the respective registrant information and associated host IP addresses may be performed in accordance with a fixed time interval.

There is further provided a device that includes an interface unit configured to enable network communications, a memory, and one or more processors coupled to the interface unit and the memory, and configured to: store a plurality of domain name system (DNS) requests, wherein each DNS request of the plurality of DNS requests comprises a combination of a higher level domain name and a lower level domain name, each of the higher level domain name and the lower level domain name being separately resolvable to a respective Internet Protocol (IP) address, and wherein the higher level domain name corresponds to a blacklist server and the lower level domain name is a domain name that is to be used as a query directed towards the blacklist server, filter the DNS requests to obtain a plurality of lower level domains, calculate a popularity score for each unique lower level domain name of the plurality of lower level domain names, determine whether a given unique lower level domain name is suspicious based on the popularity score, and when the given unique lower level domain name is determined to be suspicious based on the popularity score, add the given unique lower level domain name to a blocklist.

In an embodiment, the popularity score comprises a number of times the given unique lower level domain has been observed over a predetermined period of time and/or a number of distinct clients from whom a DNS request including the given unique lower level domain name was received.

In a further embodiment, the processors may be configured to store the given unique lower level domain name in combination with a client IP address from which a DNS request including the given unique lower level domain name was received.

In a still further embodiment, the processors may be configured to store along with the given unique lower level domain name, registrant information for the given unique lower level domain name, and a host IP address associated with the given unique lower level domain name.

The processors may be configured to, for a plurality of stored unique lower level domain names, respective registrant information and associated host IP addresses process the respective registrant information and associated host IP addresses to identify registrants or host IP addresses that are suspected of being malicious based on their respective association with the given unique lower level domain name.

In another implementation, there is provided one or more non-transitory computer readable storage media encoded with software comprising computer executable instructions and when the software is executed is operable to: store a plurality of domain name system (DNS) requests, wherein each DNS request of the plurality of DNS requests comprises a combination of a higher level domain name and a lower level domain name, each of the higher level domain name and the lower level domain name being separately resolvable to a respective Internet Protocol (IP) address, and wherein the higher level domain name corresponds to a blacklist server and the lower level domain name is a domain name that is to be used as a query directed towards the blacklist server, filter the DNS requests to obtain a plurality of lower level domains, calculate a popularity score for each unique lower level domain name of the plurality of lower level domain names, determine whether a given unique lower level domain name is suspicious based on the popularity score, and when the given unique lower level domain name is determined to be suspicious based on the popularity score, add the given unique lower level domain name to a blocklist. The popularity score comprises a number of times the given unique lower level domain has been observed over a predetermined period of time and/or a number of distinct clients from whom a DNS request including the given unique lower level domain name was received.

The above description is intended by way of example only. Various modifications and structural changes may be made therein without departing from the scope of the concepts described herein and within the scope and range of equivalents of the claims.

What is claimed is:

1. A method, comprising:
    storing a plurality of nested domain name system (DNS) requests, wherein each nested DNS request of the plurality of nested DNS requests comprises a combination of a higher level domain name and a lower level domain name, each of the higher level domain name and the lower level domain name being separately resolvable to a respective Internet Protocol (IP) address, and wherein the higher level domain name corresponds to a blacklist server and the lower level domain name is a domain name that is to be used as a query directed towards the blacklist server;
    filtering the nested DNS requests to obtain a plurality of lower level domain names;
    calculating a popularity score for each unique lower level domain name of the plurality of lower level domain names;
    determining whether a given unique lower level domain name is suspicious based on the popularity score; and
    when the given unique lower level domain name is determined to be suspicious based on the popularity score, adding the given unique lower level domain name to a blocklist.

2. The method of claim 1, wherein the popularity score comprises a number of times the given unique lower level domain has been observed over a predetermined period of time.

3. The method of claim 1, wherein the popularity score comprises a number of distinct clients from whom a nested DNS request including the given unique lower level domain name was received.

4. The method of claim 1, further comprising storing the given unique lower level domain name in combination with a client IP address from which a nested DNS request including the given unique lower level domain name was received.

5. The method of claim 1, further comprising converting the combination of a higher level domain name and a lower level domain name received in different nested DNS requests among the plurality of nested DNS requests to a regular expression before filtering.

6. The method of claim 1, further comprising blocking a reply to a new nested DNS request that includes the given unique lower level domain name.

7. The method of claim 1, further comprising disseminating the given unique lower level domain name to a network security device as a domain name to block.

8. The method of claim 1, further comprising storing along with the given unique lower level domain name, registrant information for the given unique lower level domain name, and a host IP address associated with the given unique lower level domain name.

9. The method of claim 8, further comprising, for a plurality of stored unique lower level domain names, respective registrant information and associated host IP addresses processing the respective registrant information and associated host IP addresses to identify registrants or host IP addresses that are suspected of being malicious based on their respective association with the given unique lower level domain name.

10. The method of claim 9, further comprising processing the respective registrant information and associated host IP addresses in accordance with a fixed time interval.

11. A device comprising:
an interface unit configured to enable network communications;
a memory; and
one or more processors coupled to the interface unit and the memory, and configured to:
store a plurality of nested domain name system (DNS) requests, wherein each nested DNS request of the plurality of DNS requests comprises a combination of a higher level domain name and a lower level domain name, each of the higher level domain name and the lower level domain name being separately resolvable to a respective Internet Protocol (IP) address, and wherein the higher level domain name corresponds to a blacklist server and the lower level domain name is a domain name that is to be used as a query directed towards the blacklist server;
filter the nested DNS requests to obtain a plurality of lower level domain names;
calculate a popularity score for each unique lower level domain name of the plurality of lower level domain names;
determine whether a given unique lower level domain name is suspicious based on the popularity score; and
when the given unique lower level domain name is determined to be suspicious based on the popularity score, add the given unique lower level domain name to a blocklist.

12. The device of claim 11, wherein the popularity score comprises a number of times the given unique lower level domain has been observed over a predetermined period of time.

13. The device of claim 11, wherein the popularity score comprises a number of distinct clients from whom a nested DNS request including the given unique lower level domain name was received.

14. The device of claim 11, wherein the one or more processors are configured to store the given unique lower level domain name in combination with a client IP address from which a nested DNS request including the given unique lower level domain name was received.

15. The device of claim 11, wherein the one or more processors are configured to store along with the given unique lower level domain name, registrant information for the given unique lower level domain name, and a host IP address associated with the given unique lower level domain name.

16. The device of claim 15, wherein the one or more processors are configured to, for a plurality of stored unique lower level domain names, respective registrant information and associated host IP addresses process the respective registrant information and associated host IP addresses to identify registrants or host IP addresses that are suspected of being malicious based on their respective association with the given unique lower level domain name.

17. One or more non-transitory computer readable storage media encoded with software comprising computer executable instructions and when the software is executed is operable to:
store a plurality of nested domain name system (DNS) requests, wherein each nested DNS request of the plurality of DNS requests comprises a combination of a higher level domain name and a lower level domain name, each of the higher level domain name and the lower level domain name being separately resolvable to a respective Internet Protocol (IP) address, and wherein the higher level domain name corresponds to a blacklist server and the lower level domain name is a domain name that is to be used as a query directed towards the blacklist server;
filter the nested DNS requests to obtain a plurality of lower level domain names;
calculate a popularity score for each unique lower level domain name of the plurality of lower level domain names;
determine whether a given unique lower level domain name is suspicious based on the popularity score; and
when the given unique lower level domain name is determined to be suspicious based on the popularity score, add the given unique lower level domain name to a blocklist.

18. The non-transitory computer readable storage media of claim 17, wherein the popularity score comprises a number of times the given unique lower level domain has been observed over a predetermined period of time.

19. The non-transitory computer readable storage media of claim 17, wherein the popularity score comprises a number of distinct clients from whom a nested DNS request including the given unique lower level domain name was received.

20. The non-transitory computer readable storage media of claim 19, wherein when the software is executed is further operable to store the given unique lower level domain name in combination with a client IP address from which a nested DNS request including the given unique lower level domain name was received.

* * * * *